Oct. 30, 1956          H. LINDEMANN          2,768,407

PROCESS FOR THE PRODUCTION OF CLOSED CELL CELLULAR BODIES

Filed Nov. 27, 1951

---

INTRODUCING THERMOPLASTIC RESIN MASS INTO MOLD.

---

GASSING RESIN MASS UNDER HEAT AND PRESSURE TO FORM HEATED GELATINIZED GAS-CONTAINING RESIN MASS CONTAINING THE GAS DISSOLVED THEREIN AND HAVING A SPECIFIC VOLUME AND BEING UNDER PRESSURE

---

INCREASING THE VOLUME OF THE HEATED GELATINIZED RESIN MASS BY ABOUT 1/5 – 2/5 WHILE CORRESPONDINGLY REDUCING THE PRESSURE THEREON, AND MAINTAININING THE INCREASED VOLUME AND REDUCED PRESSURE UNTIL THE GAS HAS FORMED SMALL UNIFORM GAS-CONTAINING CELLS IN THE HEATED GELATINIZED RESIN MASS

---

COOLING WHILE MAINTAINING SAID INCREASED VOLUME AND REDUCED PRESSURE

---

FURTHER REDUCING THE PRESSURE, REMOVING THE BODY FROM THE MOLD AND EXPANDING IT BY HEATING WITHOUT APPLICATION OF PRESSURE

---

*INVENTOR:*
Herbert Lindemann
BY:
Michael S. Striker
agt.

United States Patent Office 2,768,407
Patented Oct. 30, 1956

2,768,407

PROCESS FOR THE PRODUCTION OF CLOSED CELL CELLULAR BODIES

Herbert Lindemann, Sins, Aargau, Switzerland, assignor to Lonza Electric and Chemical Works Ltd., Gampel, Wallis, Switzerland, a Swiss company Application November 27, 1951, Serial No. 258,527

Claims priority, application Switzerland December 5, 1950

6 Claims. (Cl. 18—48)

This invention relates to the production of closed cell cellular bodies from thermo-plastic masses.

Hitherto closed cell cellular bodies have been made with the aid of expansion agents from thermo-plastic materials by heating the mass containing the expansion agent in tightly closed moulds, which are filled more or less completely with material. At the temperatures employed the expansion agent decomposes and the gases thus developed then dissolve more or less completely in the mass as a result of the consequent high pressure. The gas-containing mass is cooled in this condition in the mould, the pressure is relieved and thereupon the mass is caused to expand fully by re-heating.

Processes of this kind have hitherto not given satisfactory results in practice. Amongst other things cell formation takes place in an extraordinarily variable manner due to certain uncontrollable circumstances, so that uniform manufacture is not possible. Thus it may happen that well developed cells are produced, for example of about $1/10$–$5/10$ mm. diameter with uniform thin cell walls, which possess good properties. At the same time, however, cells of larger diameter are also produced, which may be referred to as sponge cells since they are quite unstable, tend to burst and lose gas during the expansion stage. Sponge cells of this kind are of non-uniform construction and are not adapted to retain a gas hermetically. Cells may also be produced, however, of a diameter, for example, of approximately $1/100$ mm. or less, which may be referred to as micro cells. Generally mixtures of such micro cells with larger cells are produced. These micro cells are likewise very undesirable. Cellular bodies consisting wholly or largely of micro cells are generally unstable and do not retain their shape. The thermo-plastic starting materials employed are not capable of forming cells with sufficiently strong walls having regard to the large quantities of micro cells as compared with the quantity of gas, so that some at least of the cells rupture during the expansion stage and cellular bodies of poor appearance are produced with flawed surfaces.

When cellular bodies are produced by these methods, structures may thus be produced which contain different types of cells, each of which in itself has different properties. Consequently, it is not possible by this process to produce satisfactory cellular material which retains its shape.

An attempt has been made to get better results by not filling the mould completely with the material. This leads, not to success, but to further faults similar to those which appear when a mould is used which is not properly closed. In particular decomposition takes place in the interior of the mass when this method is used. This decomposition is due to the fact that the nitrogen-liberating expansion agents generally used decompose by an exothermic reaction. When large quantities of expansion agent are used, which cannot be avoided when light cellular bodies are to be formed, such decomposition takes place very readily. Moreover, the cell formation is very non-uniform when the mould is not quite completely filled. In particular the so-called sponge cells are produced, which are not capable of retaining gas. When the mould is insufficiently filled, the pressure in the interior of the mould cannot rise to a height sufficient to produce proper solution of the expansion gases. The gas developed by the decomposition of the expansion agent does not dissolve properly, but causes the contents of the mould to foam up to some extent, which causes sponge cells to be formed.

Manufacture has therefore usually been carried out in moulds filled as fully as possible with the thermo-plastic material. With the methods hitherto generally used, it has been found hardly possible in practice to keep a mould filled with a mass containing an expansion agent completely hermetically sealed during the heating stage. The expansion of the material on heating produces forces so great that in practice it is impossible to keep the mould hermetically sealed. When, however, material escapes through any opening which may form, the high pressure developed by the expansion agent causes an incalculably large or small quantity of material to escape from the mould. A mould which is not hermetically sealed leads to quite incalculable pressures within it and thus in most cases to a very non-uniform material.

It has already been proposed to allow a part of the gas-containing material to escape from the mould during the heating stage, but before the mass gelatinises, so that the mass can expand by an amount of the order of 10% of its original volume. This method also led to non-uniform cell formation so that the bodies produced were deformed and not true to shape. The unavoidable loss of material in this method was a great disadvantage, since the material forced out of the mould is changed to such an extent that it can hardly be re-used. This led to losses of material.

It has now been found, in accordance with the present invention, that uniform cell formation can be obtained throughout the whole cellular body in that, after the gases have been dissolved under pressure in the mass, and the mass has gelatinised completely, the pressure is reduced without the material escaping from the mould, so that the volume of the mass in the mould increases by $1/5$ to $2/5$, preferably $1/3$, of the original volume.

It has further been found that moulded bodies with the desired, non-spongy and non-microporous, cell structure can preferably be produced by using a mould which permits of varying the pressure within the mould whilst the material is being heated, and of varying at the appropriate time the volume occupied by the mass in the mould under high pressure.

For this purpose the mass is first kept under a high pressure during the heating stage, until the mass has been heated through completely, the expansion agent has decomposed, the gases have dissolved and the whole material has reached a uniform consistency. Thereafter the volume occupied by the mass is increased by $1/5$ to $2/5$, preferably $1/3$, of the volume of the strongly compressed mass by slightly relieving the pressure, for example by appropriate movement of a die. When this is done it is found that the decomposition of the expansion agent is somewhat retarded by the high pressure employed during the heating stage, so that the heat liberated during the exothermic decomposition of the expansion agent is probably developed slowly, and is consequently conducted away without the initial moulding material being decomposed by an undesirably rapid rise in temperature. The high pressure produced on the mass by the gas as it is liberated causes the latter to dissolve completely. When the volume is now allowed to increase, and the pressure is consequently allowed to fall, the previously dissolved gas is again liberated and forms very small uniform cells. It is not necessary to prolong this operation; generally a few minutes is sufficient. After this the mass is cooled, the mould is opened and the mass is expanded in manner known per se. Experiments have shown that the small cells produced in the mould by the reduction in pressure are distributed very uniformly in the mass. The cells increase uniformly in size during the expansion stage and form cellular bodies containing cells of the desired order of size, which are all of uniform size and are uniformly distributed. The cellular bodies contain hardly any micro cells or sponge cells and are also very stable.

Hardly any expansion is possible when completely filled and hermetically sealed moulds are used. If the material is heated in this condition and then cooled, it solidifies with the gas dissolved in it. When the mass is subsequently relieved of pressure by opening the mould, and reheated, the gas is liberated—i. e. passes from the dissolved into the gaseous condition—within a mass which is already solidified, and forms the undesired micro pores. Only by the change of state provided by the invention, i. e. by the preliminary expansion under pressure in the mould, can very small cells be formed within the starting material whilst the latter is still hot, which cells need only expand further after the final cooling step during the subsequently normal expansion step. The above-mentioned preliminary expansion enables the cell formation to be completely controlled and cellular bodies to be produced with a uniform cell structure and optimum properties.

As explained, the gases which dissolve in the mass can be produced by the decomposition of expansion agents within the mass itself. The gases can also however be forced into the mass from outside. The process of the invention can further be applied in appropriate manner to the production of cellular bodies by the introduction of gases by the known process by means of a die mould, in which case the starting material consists of a loose, crumbly, powdery mass. In order to obtain a uniform cell structure, the high pressure originally employed to dissolve the gas must be reduced, in this case also, as described above, after the gas has dissolved and the material has reached the right consistency. In this case also preliminary formation of small cells takes place within the mould. Again in this case, the pre-formed small cells increase in size during the re-heating step following the cooling step, and form the final cellular body. When the process is carried out properly hardly any so-called micro cells and no sponge cells are formed. The cellular body contains quite uniformly constructed cells, which retain the gas hermetically and have a diameter, for example, of approximately 0.2–0.5 mm.

When expansion agents are employed for the process, just as when cellular material is produced by means of gas supplied from outside, it is preferable to use a press tool, preferably of cylindrical shape, the upper part of the mould consisting of a movable die and the lower part consisting of a matrix; preferably this die is moved by means of a hydraulic plate with heatable platens. In this way it is possible to regulate the pressure and volume within the mould satisfactorily during the heating stage. In this way, by varying the pressure of the hydraulic press, the pressure in the mould can be varied as desired by means of the die, by withdrawing the die from the mould far enough to produce the desired increase in volume. The moulds must of course be constructed to give a hermetic seal at the pressures of approximately 100 atmospheres which arise, and at the gelatinisation temperature which is generally 160° C.

Alternatively a completely hermetically sealed mould without a movable die can be used, i. e. a rigid mould consisting of a lower mould part rigidly joined to an upper mould part or consisting of an autoclave. The mould is only partly filled with a mass containing an expansion agent, generally in the form of a paste or viscous dough. After the mould has been closed and appropriate heating means have been provided, the remaining void space is filled with a gas under pressure, most simply with nitrogen at a pressure, for example, of 200 atmospheres, or with another indifferent medium at the same pressure. When the mass is heated, and more particularly when the expansion agent decomposes, the pressure increases. After the starting material has been completely warmed through and has reached the desired and necessary consistency, the gas or other medium used to exert pressure on the mass is allowed to escape, so that in this way the volume of the mass is increased by about ⅓ of its original volume.

If for any reason the gas cushion or other indifferent filler is chosen larger, care must be taken that the increase in volume of the material remains within the above mentioned limits; if for example the increase in volume is appreciably larger, large sponge pores are produced instead of the desired small cells of approximately 0.2–0.5 mm. diameter, and impart quite undesired properties to the final product.

As already explained, at the beginning of the hearing stage it is necessary at first—i. e. before the expansion agent decomposes—to employ a high pressure, for example of 150–300 atmospheres, within a hermetically sealed mould, for example a die mould, in order to slow down the decomposition of the expansion agent and to cause the gas to dissolve. For this purpose the die preferably bears against the material and compresses it. The pressure varies with the height of the mould. A shallow layer of material requires a lower pressure and a deep layer requires a higher pressure. On heating the expansion agent decomposes. As the expansion agent is finely divided, the liberated nitrogen gas dissolves almost instantaneously in the starting material under the pressure prevailing. After the starting material has been sufficiently gelatinised (the time required for this depends upon the depth of the material), the volume is increased or the pressure reduced within the mould sufficiently to enable the material to expand by approximately ⅓ of its original volume. Suitable thermo-plastic plastics include in particular masses containing polyvinyl chloride, which contain more or less plasticisers or solvents depending upon the type of product to be produced. These masses are intimately mixed with the expansion agent and then treated at pressures as indicated above and temperatures of approximately 160° C. Other thermo-plastic plastics can be employed, however, such for example as polystyrene, copolymers and cellulose acetate. The expansion agents employed may for example be the known diazo compounds, such for example as azoisobutyric acid dinitrile. After the gas has dissolved and the whole contents of the mould have reached a uniform consistency, the material is allowed to increase in volume by about ⅓. Thereafter the masses are further worked up in manner known per se as described above.

The novel features which are considered as characteristic for the invention are set forth in particular in the appended claims. The invention itself, as to its method of operation, together with additional objects and advantages thereof, will be best understood from the following description of specific embodiments when read in connection with the accompanying drawing in which the figure shows a flow sheet illustrating the process of the present invention.

The following examples show how the process of the invention may be carried into effect.

*Example 1*

500 gm. of well stabilised polyvinyl chloride, 500 gm. of dioctyl phthalate and 150 gm. of azoisobutyric acid dinitrile are thoroughly mixed and filled into a die mould. The mould is heated and subjected to pressure in a hydraulic press. The press is caused to exert a pressure of 250 kg./cm.² on the mould, i. e. a total force of approximately 122,000 kg. For example with a round mould of 250 mm. diameter, filled with a mass of specific gravity of approximately 1.25, the mass filled into the mould forms a layer approximately 19 mm. high when it has been completely compressed by the die pressure derived from the press. The mould is now heated to approximately 160° C. for approximately 1 hour. The pressure of the press is then reduced sufficiently to allow the die to move approximtaely 6 mm. out of the mould and heating is continued for a few minutes further.

As a result of the increase in the volume of the mould the previously dissolved nitrogen gas is again liberated and forms very small cells. After cooling, the mould is opened and the cellular body thus produced, the cells of which are filled with gas under very high pressure, is caused to expand completely in the usual way by reheating without counter-pressure. A very uniform cellular structure is produced having cells of a diameter of 0.2–0.5 mm. and having a specific weight of approximately 0.05.

*Example 2*

500 gm. of a well stabilised polyvinyl chloride, 500 gm. of dioctyl phthalate and 150 gm. of azoisobutyric acid dinitrile are mixed to form a freely flowing paste. This mixture is now introduced into a mould (autoclave) which can be hermetically sealed with a lid. Assuming that this mould again has a diameter of 250 mm., it will be made of a height of at least 25 mm. The pasty mixture is poured in and forms a layer approximately 19–20 mm. high in the mould. The mould is hermetically sealed and the void space within the mould is filled with nitrogen gas at a pressure of 250 kg./cm.². The mould is again heated in known manner; it is heated rather longer than 1 hour, since heat is not transmitted so quickly through the gas layer. After the mass has gelatinised through sufficiently, the material is allowed to expand by letting off gas so that the mass again expands by about ⅓ of its volume. The mass is further treated exactly as described in Example 1, i. e. cooled, expanded a second time, and so on. A cellular body is produced similar to that described in Example 1.

*Example 3*

500 gm. of polyvinyl chloride, 500 gm. of dioctyl phthalate and 150 gm. of methylethyl ketone are mixed to form a loose powdery material. This mixture is filled into a die mould. Approximately 30 litres of nitrogen gas, calculated at normal pressure, are forced into the mould, the mould is then shut down and a pressure of approximately 400 kg./cm.² is exerted by the die on the material and the gas. The mould is heated until the mass has gelatinised completely, which takes about 1 hour. The pressure exerted by the press is then reduced to withdraw the die from the mould far enough to allow the contents of the mould to expand by about ⅓ of their volume. After a few minutes the mass can be cooled, and it is further treated in the usual way. A cellular body of a specific weight of approximately 0.05 is produced with very fine uniform cells of approximately 0.2–0.6 mm. diameter.

What I claim is:

1. A process of producing a closed-cell gas-containing cellular thermoplastic resin article having a uniform cell structure, comprising the steps of forming in a closed molding means a heated gelatinized gas-containing thermoplastic resin mass containing said gas dissolved therein and having a specific volume and being under pressure so that said gas dissolved in said resin mass is under pressure; increasing the volume of said heated gelatinized resin mass by about ⅕–⅔ while correspondingly reducing the pressure thereon so as to liberate said dissolved gas and form small cells containing gas under pressure in said gelatinized resin mass, and maintaining said increased volume and reduced pressure until said gas has formed small uniform cells containing said gas under pressure distributed throughout said heated gelatinized resin mass; cooling said resin mass containing said small cells containing gas under pressure while maintaining said increased volume and reduced pressure so as to obtain a cooled resin mass containing small cells with gas under pressure; further reducing the pressure on said cooled resin mass containing small cells having gas under pressure, removing the same from said molding means and expanding it by heating without application of pressure so as to form a closed-cell uniformly cellular resin body.

2. A process of producing a closed-cell gas-containing cellular thermoplastic resin article having a uniform cell structure, comprising the steps of forming in a closed molding means a heated gelatinized gas-containing thermoplastic resin mass containing said gas dissolved therein and having a specific volume and being under gas pressure in said closed molding means so that said gas dissolved in said resin mass is under pressure; reducing said gas pressure on said heated gelatinized resin mass in said closed molding means only sufficiently to increase the volume of said mass by about ⅕–⅔ so as to liberate said dissolved gas and form small cells containing gas under pressure in said gelatinized resin mass, and maintaining said reduced pressure and increased volume until said gas has formed small uniform cells containing said gas under pressure distributed throughout said heated gelatinized resin mass; cooling said resin mass containing said small cells containing gas under pressure while maintaining said increased volume and reduced pressure so as to obtain a cooled resin mass containing small cells with gas under pressure; further reducing the pressure on said cooled resin mass containing small cells having gas under pressure, removing the same from said molding means and expanding it by heating without application of pressure so as to form a closed-cell uniformly cellular resin body.

3. A process of producing a closed-cell gas-containing cellular thermoplastic resin article having a uniform cell structure, comprising the steps of forming in a closed molding means a heated gelatinized gas-containing thermoplastic resin mass containing said gas dissolved therein and having a specific volume and being under pressure so that said gas dissolved in said resin mass is under pressure; increasing the volume of said heated gelatinized resin mass by about ⅕–⅔ while correspondingly reducing the pressure thereon so as to liberate said dissolved gas and form small cells containing gas under pressure in said gelatinized resin mass, and maintaining said increased volume and reduced pressure until said gas has formed small uniform cells containing said gas under pressure distributed throughout said heated gelatinized resin mass; cooling said resin mass containing said small cells containing gas under pressure while maintaining said increased volume and reduced pressure so as to obtain a cooled resin mass containing small cells with gas under pressure; further reducing to approximately atmospheric pressure the pressure on said cooled resin mass containing small cells having gas under pressure, removing the same from said molding means and expanding it by heating without application of pressure so as to form a closed-cell uniformly cellular resin body.

4. A process of producing a closed-cell gas-containing cellular thermoplastic resin article having a uniform cell structure, comprising the steps of introducing a thermoplastic resin mass into a closed mold; introducing a gas from without said mold into said mold under pressure so as to impregnate said thermoplastic resin mass with said gas; heating the thus gassed thermoplastic resin mass under pressure under gelatinization of said thermoplastic resin so as to cause dissolution of said gas in said heated gelatinized thermoplastic resin mass; increasing the volume of said heated gelatinized resin mass by about ⅓–⅔ while correspondingly reducing the presure thereon so as to liberate said dissolved gas and form small cells containing gas under pressure in said gelatinized resin mass, and maintaining said increased volume and reduced pressure until said gas has formed small uniform cells containing said gas under pressure distributed throughout said heated gelatinized resin mass; cooling said resin mass containing said small cells containing gas under pressure while maintaining said increased volume and reduced pressure so as to obtain a cooled resin mass containing small cells with gas under pressure; further reducing the pressure on said cooled resin mass ocntaining small cells having gas under pressure, removing the same from said molding means and expanding it by heating without application of pressure so as to form a closed-cell uniformly cellular resin body.

5. A process of producing a closed-cell gas-containing cellular thermoplastic resin article having a uniform cell structure, comprising the steps of introducing a themoplastic resin mass including a blowing agent into a closed mold; heating said resin mass and said blowing agent in said closed mold under pressure so as to cause decomposition of said blowing agent and evolution of gas therefrom which is dissoved in said heated resin mass, thereby forming a heated gelatinized gas-containing thermoplastic resin mass containing said gas dissolved therein and having a specific volume and being under pressure so that said gas dissolved in said resin mass is under pressure; increasing the volume of said heated gelatinized resin mass by about ⅓–⅔ while correspondingly reducing the pressure thereon so as to liberate said dissolved gas and form small cells containing gas under pressure in said gelatinized resin mass, and maintaining said increased volume and reduced pressure until said gas has formed small uniform cells containing said gas under pressure distributed throughout said heated gelatinized resin mass; cooling said resin mass containing said small cells containing gas under pressure while maintaining said increased volume and reduced pressure so as to obtain a cooled resin mass containing small cells with gas under pressure; further reducing the pressure on said cooled resin mass containing small cells having gas under pressure, removing the same from said molding means and expanding it by heating without application of pressure so as to form a closed-cell uniformly cellular resin body.

6. A process of producing a closed-cell gas-containing cellular thermoplastic resin article having a uniform cell structure, comprising the steps of forming in a closed mold provided with a movable wall a heated gelatinized gas-containing thermpolastic resin mass containing said gas dissolved therein and having a specific volume and being under pressure so that said gas dissolved in said resin mass is under pressure; moving said movable wall outwardly only sufficiently to increase the volume of said heated gelatinized resin mass by about ⅓–⅔ while correspondingly reducing the pressure thereon so as to liberate said dissolved gas and form small cells containing gas under pressure in said gelatinized resin mass, and maintaining said increased volume and reduced pressure until said gas has formed small uniform cells containing said gas under pressure distributed throughout said heated gelatinized resin mass; cooling said resin mass containing said small cells containing gas under pressure while maintaining said increased volume and reduced pressure so as to obtain a cooled resin mass containing small cells with gas under pressure; further reducing the pressure on said cooled resin mass containing small cells having gas under pressure, removing the same from said molding means and expanding it by heating without application of pressure so as to form a closed-cell uniformly cellular resin body.

References Cited in the file of this patent

UNITED STATES PATENTS

| | | |
|---|---|---|
| 1,515,475 | Goodwin | Nov. 11, 1924 |
| 2,405,345 | Cooper | Aug. 6, 1946 |
| 2,450,436 | McIntire | Oct. 5, 1948 |
| 2,525,966 | Smith | Oct. 17, 1950 |
| 2,576,749 | Carpentier | Nov. 27, 1951 |
| 2,576,911 | Amos | Dec. 4, 1951 |
| 2,577,381 | Stirnemann | Dec. 4, 1951 |